United States Patent [19]

Kato et al.

[11] Patent Number: 4,484,488

[45] Date of Patent: Nov. 27, 1984

[54] FORWARD-REVERSE CHANGEOVER APPARATUS FOR WORKING VEHICLE

[75] Inventors: Keizo Kato, Sakai; Yasunobu Yamaue, Izumi, both of Japan

[73] Assignee: Kubota, Ltd., Osaka, Japan

[21] Appl. No.: 370,303

[22] Filed: Apr. 21, 1982

[30] Foreign Application Priority Data

Sep. 29, 1981 [JP] Japan .................................. 56-155369
Dec. 14, 1981 [JP] Japan .................................. 56-201908

[51] Int. Cl.³ ............................ F16H 3/14; F16H 3/08
[52] U.S. Cl. ........................................ 74/361; 74/360; 74/359
[58] Field of Search ................. 74/361, 360, 359, 358, 74/357

[56] References Cited

U.S. PATENT DOCUMENTS

| | | | |
|---|---|---|---|
| 1,316,633 | 9/1919 | Munson | 74/359 |
| 1,938,855 | 12/1933 | Moyer | 74/361 X |
| 2,117,852 | 5/1938 | Pearmain | 74/361 X |
| 4,023,418 | 5/1977 | Zenker | 74/360 X |

FOREIGN PATENT DOCUMENTS

| | | | |
|---|---|---|---|
| 1192901 | 9/1962 | Fed. Rep. of Germany | 74/361 |
| 1950914 | 10/1978 | Fed. Rep. of Germany | 74/360 |
| 1075637 | 10/1954 | France | 74/361 |

OTHER PUBLICATIONS

"Design in Action", Machine Design, pp. 122, 123, Mar. 5, 1959.

Primary Examiner—Allan D. Herrmann
Assistant Examiner—Dirk Wright
Attorney, Agent, or Firm—Edwin E. Greigg

[57] ABSTRACT

A forward-reverse changeover apparatus for working vehicles which comprises first and second multiplate clutches, and an input shaft and an output shaft arranged concentrically with and separated from each other. Output gears extending from the first and second clutches respectively have the same number of teeth, and the output gear from the second clutch is positioned closer to the input shaft than an input gear on the output shaft.

5 Claims, 4 Drawing Figures

FORWARD-REVERSE CHANGEOVER APPARATUS FOR WORKING VEHICLE

BACKGROUND OF THE INVENTION

1. Field of the Invention

The present invention relates to a forward-reverse changeover apparatus for working vehicles which comprises an input shaft, an output shaft arranged coaxially with and separated from the input shaft, first and second multiplate clutches rotatable about axes parallel to the input shaft, gears having the same number of teeth and coaxially rotatable with the first and second clutches respectively for giving an input to the clutches individually, the gears meshing with an output gear on the input shaft at different positions along the circumference of the output gear, an input gear mounted on the output shaft and meshing with an output gear rotatable coaxially with an output member extending from the first clutch, an output gear rotatable coaxially with an output member extending from the second clutch and meshing with a reverse rotation gear, the input gear on the output shaft being in mesh with the reverse rotation gear.

2. Description of the Prior Art

Such forward-reverse changeover apparatus heretofore known are adapted to effect forward-reverse changeover easily and rapidly by advantageously using the first and second multiplate clutches. The first and second clutches are arranged at different positions along the circumference of the output gear on the input shaft to reduce the axial length of the input shaft as well as of the output shaft. The conventional apparatus, however, involve the inconvenience of giving a forward speed and a reverse speed which are different.

With the conventional arrangement, the output gear extending from the second clutch for reverse transmission and the input gear on the output shaft are located at the same position with respect to the axis of the output shaft, so that in order to avoid simultaneous meshing of the output gear of the second clutch and the above-mentioned reverse rotation gear with the input gear on the output shaft, the output gear used for the second clutch is smaller in diameter and tooth number than the output gear extending from the first clutch for forward transmission. For this reason, the above inconvenience has been experienced.

SUMMARY OF THE INVENTION

In view of the foregoing situation, the present invention has been accomplished to provide the same output speed in the forward position and in the reverse position by an efficient improvement achieved with attention directed to the different frequencies with which the two clutches are actually used for working, without using an input shaft or output shaft of increased axial length.

The present invention provides a forward-reverse changeover apparatus for working vehicles which comprises an input shaft, an output shaft arranged coaxially with and separated from the input shaft, first and second multiplate clutches rotatable about axes parallel to the input shaft, gears having the same number of teeth and coaxially rotatable with the first and second clutches respectively for giving an input to the clutches individually, the gears meshing with an output gear on the input shaft at different positions along the circumference of the output gear, an input gear mounted on the output shaft and meshing with an output gear rotatable coaxially with an output member extending from the first clutch, an output gear rotatable coaxially with an output member extending from the second clutch and meshing with a reverse rotation gear, the input gear on the output shaft being in mesh with the reverse rotation gear. The present apparatus is characterized in that the output gears extending from the first and second clutches have substantially the same number of teeth and that the output gear extending from the second clutch is positioned closer to the input shaft than the input gear on the output shaft.

Working vehicles are operated chiefly in the forward position with the second clutch for reverse transmission used much less frequently than the first clutch for forward transmission, so that the second clutch can be less than the first clutch in the number of frictional transmission plates without causing any particular trouble to actual operation. With attention focused on this point, the output gear extending from the second clutch is positioned closer to the input shaft than the input gear on the output shaft to thereby avoid simultaneous meshing of the output gear extending from the second clutch and the reverse rotation gear with the input gear on the output shaft, whereas the same output speed is made available in the forward position and in the reverse position without using an input shaft or output shaft of increased axial length because the output gears extending from the first and second clutches have substantially the same number of teeth. Thus the forward-reverse changeover apparatus is very useful for working vehicles.

Other objects and advantages of the present invention will become apparent from the following description.

BRIEF DESCRIPTION OF THE DRAWINGS

The drawings show a forward-reverse changeover apparatus embodying the invention for use in working vehicles.

DESCRIPTION OF THE PREFERRED EMBODIMENT

Figure 1:
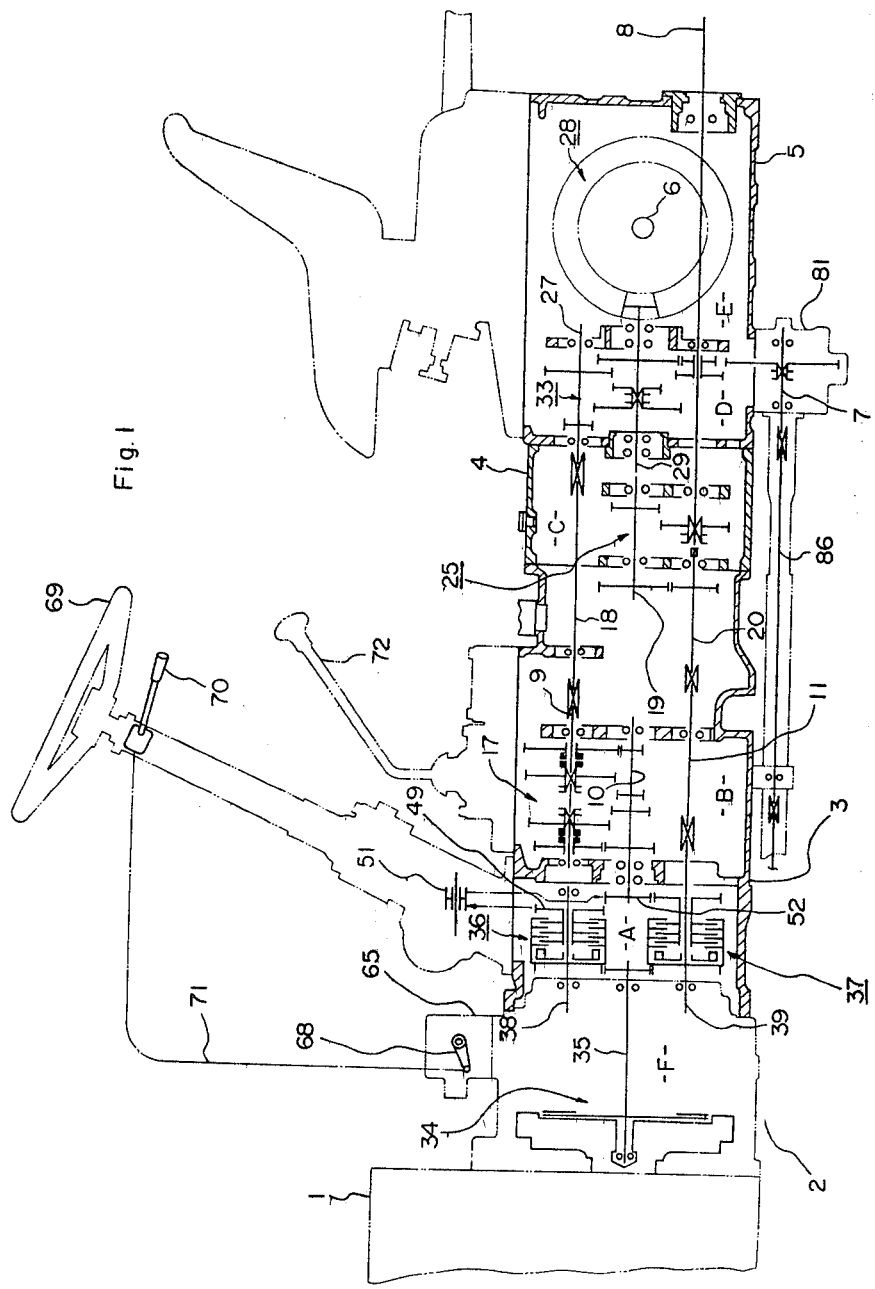
FIG. 1 is a side elevation schematically showing a transmission system.
Figure 2:
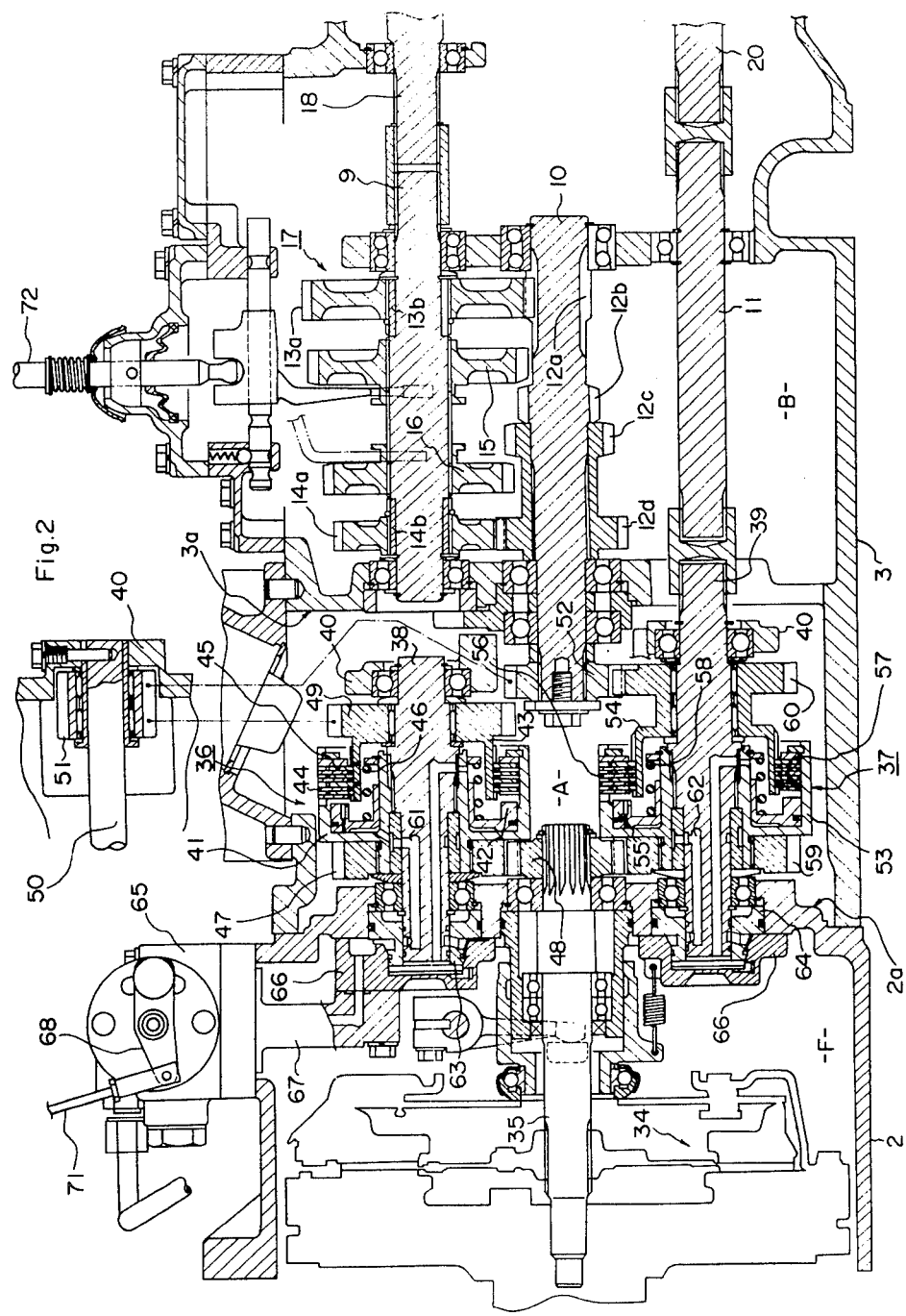
FIG. 2 is a side elevation in vertical section and development showing the forward-reverse changeover apparatus.

The drawings show the power transmission system of an agricultural tractor including an engine 1, a main clutch housing 2, a transmission case 3, an intermediate case 4 and a differential gear case 5 which are connected together in series in the order mentioned. The power of the engine is subjected to suitable gear speed change within the cases and is delivered to rear wheel drive shafts 6, 6 on the opposite sides of the differential gear case 5, to a transmission shaft 7 supported by the bottom of the transmission case 3 and extending forward for driving the front wheels, and to a PTO shaft 8 projecting rearward from the case 5.

An intermediate transmission chamber A is provided between and defined by the front wall 3a of the transmission case 3 and the rear wall 2a of the main clutch housing 2. A main speed change chamber B for the running system is provided behind the chamber A. The interior of the intermediate case 4 serves as a PTO speed change chamber C. An auxiliary speed change chamber D for the running system is formed in the front half of the differential gear case 5, and a differential speed change chamber E in the rear half thereof.

The main speed change chamber B has a speed change shaft 9, an input shaft 10 serving as an output shaft for the forward-reverse changeover apparatus to be described later, and a first intermediate transmission shaft 11 for the PTO system. These shafts are arranged one above another in parallel. The input shaft 10 is fixedly provided with four gears 12a, 12b, 12c, 12d which are different in diameter. Speed change gears 13a, 14a meshing with the first gear 12a and the fourth gear 12d on the input shaft 10 respectively are freely rotatably mounted by spline bosses 13b, 14b on the speed change shaft 9. A pair of shift gears 15, 16 is splined to the shaft 9. The first shift gear 15 gives a first speed when shifted rearward and fittingly joined to the spline boss 13b of the gear 13a. When shifted forward and directly meshed with the second gear 12b, the first shift gear 15 affords a second speed. The second shift gear 16 gives a third speed when shifted rearward into direct meshing engagement with the third gear 12c, or a fourth speed when shifted forward and fittingly joined to the spline boss 14b of the speed change gear 14a. In this way, a main speed change mechanism 17 is constructed. An interconnecting shaft 18 coupled to the rear end of the speed change shaft 9 coaxially therewith extends into an upper portion of the PTO speed change chamber C.

The PTO speed change chamber C has the interconnecting shaft 18, a speed change shaft 19 and the PTO shaft 8 as arranged one above another in parallel. The speed change shaft 19 is coaxial with the input shaft 10. The PTO shaft 8 is disposed in end-to-end relation to a second intermediate transmission shaft 20 which is coupled at its front end to the rear end of the first intermediate transmission shaft 11 for the PTO system. The speed change shaft 19 is operatively connected to the second intermediate shaft 20 by reduction gears 21, 22. A shift gear 23 splined to the front end of the PTO shaft 8 is rearwardly shiftable to mesh with a small gear 24 fixedly mounted on the shaft 19, whereby the PTO shaft 8 is driven at a low speed. When the shift gear 23 is shifted forward and splined directly to the rear end of the second intermediate shaft 20, the PTO shaft 8 is driven at the same speed as the shaft 20. Thus a PTO speed change mechanism 25 is constructed.

The auxiliary speed change chamber D is provided with a speed change shaft 27 coaxially coupled to the rear end of the interconnecting shaft 18, a bevel pinion shaft 29 operatively connected to a differential speed change mechanism 28, and the PTO shaft 8. These shafts are arranged one above another in parallel. Like the speed change shaft 19 of the PTO speed change mechanism 25, the bevel pinion shaft 29 is in alignment with the input shaft 10. A double gear composed of shift gears 30a, 30b and splined to the bevel pinion shaft 29 affords a low speed when shifted forward to mesh the shift gear 30a with a small gear 31 fixed to the speed change shaft 27. When the double gear is shifted rearward to mesh the shift gear 30b with a large gear 32 on the shaft 27, a high speed is available. Thus an auxiliary speed change mechanism 33 is constructed.

Figure 3:
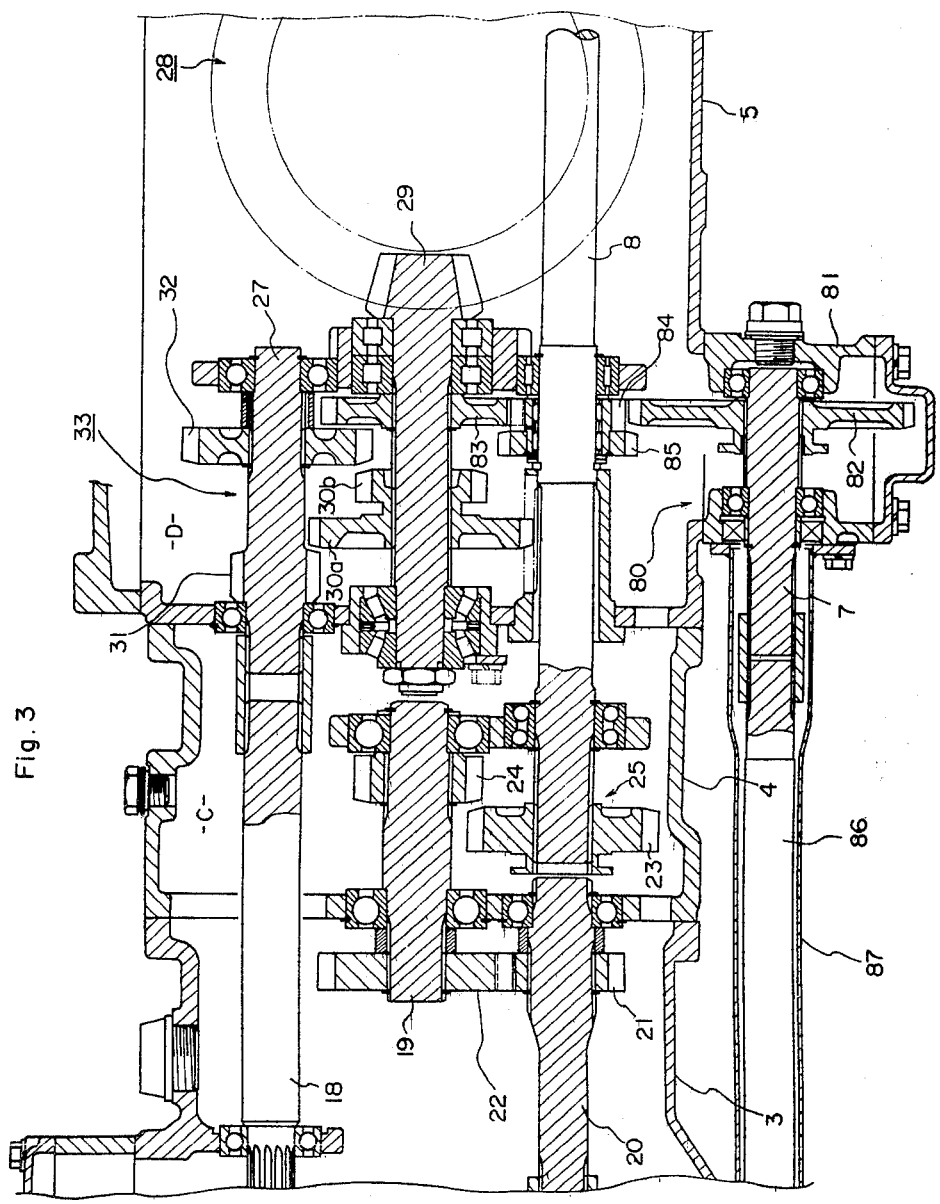
FIG. 3 is a side elevation in vertical section showing an auxiliary speed change mechanism.
Figure 4:
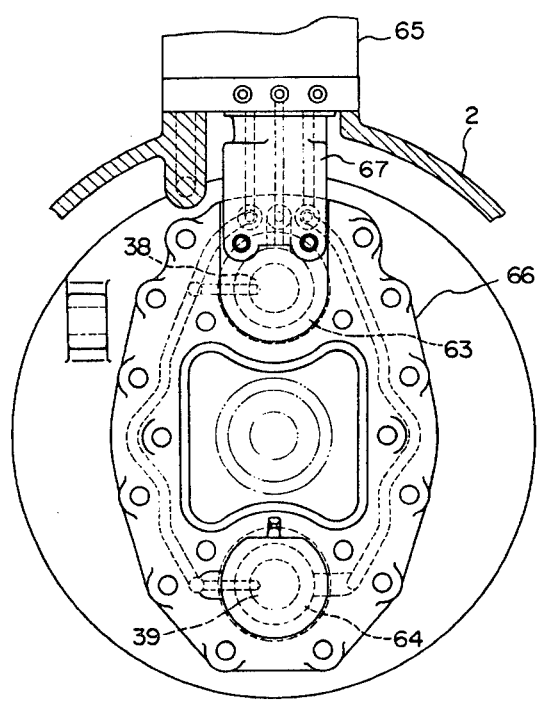
FIG. 4 is a front view showing connecting blocks.

The differential gear case 5 has a bottom opening 80 which is externally provided with a transmission case 81 supporting the transmission shaft 7 for driving the front wheels. A shift gear 82 splined to the transmission shaft 7 is projected into the case 5 through the opening 80. A gear 83 fixed to the terminal speed change shaft, namely the bevel pinion shaft 29, meshes with an idle gear 84 supported on the PTO shaft 8. The shift gear 82 is meshable with and disengageable from a gear 85 integral with the gear 84. The shift gear 82, when shifted, runs the tractor by four-wheel drive or rear-wheel drive alternatively. FIG. 3 further shows a transmission shaft 86 extending to a differential speed change mechanism for the front wheels and a shaft cover 87. When the tractor is driven by the rear wheels only, the opening 80 is closed with a cover in place of the transmission case 81.

An apparatus of the hydraulic clutch type for forward-reverse changeover is installed in the intermediate transmission chamber A as will be described below in detail.

Extending into the chamber A is the front end of the running system input shaft 10 corresponding to the output shaft of the changeover apparatus. The apparatus is disconnectably coupled to the engine 1 by a main clutch 34 for power transmission and has an input shaft 35, the rear end of which is coaxial with and separated from the front end of the input shaft 10 within the chamber A. First and second multiplate clutches 37, 36 are arranged below and above these shafts 10, 35. Intermediate transmission shafts 38, 39 rotatable about axes parallel to the shafts 10, 35 are supported on the main clutch housing rear wall 2a and a bracket 40 attached to the wall.

The second clutch 36 in the upper position comprises a drive drum 41 fixed to the intermediate shaft 38, a piston 42 housed in the drum 41, a driven drum 43 freely rotatably mounted on the shaft 38 and frictional transmission plates 44 . . . , 45 . . . provided between the drums 41 and 43. The piston 42, when shifted rightward with pressure oil, presses the plates 44 into contact with the plates 45 to transmit power from the drum 41 to the drum 43. When freed from the hydraulic pressure, the piston 42 is returned leftward by a spring 46 to interrupt the power transmission. An input gear 47 fixed to the drive drum 41 is in mesh with an output gear 48 fixedly mounted on the rear end of the input shaft 35. An output gear 49 integral with the driven drum 43 is in mesh with a reverse rotation gear 51 of large width which is freely rotatably supported by a shaft 50 within the intermediate transmission chamber A and which is in mesh with an input gear 52 secured to the front end of the output shaft 10 to couple the gear 49 to the gear 52. Like the second clutch 36, the first clutch 37 in the lower position comprises a drive drum 53, a driven drum 54, a piston 55, frictional transmission plates 56 . . . , 57 . . . , and a return spring 58. An input gear 59 attached to the drive drum 53 meshes with the output gear 48, while an output gear 60 integral with the driven drum 54 meshes directly with the input gear 52. The lower first clutch 37 is used for the transmission of positive rotation (forward transmission), and the upper second clutch 36 for the transmission of reverse rotation (reverse transmission). The input gears 59, 47 for the first and second clutches 37, 36 have substantially the same number of teeth, and the output gears 60, 49 for the first and second clutches 37, 36 also have substantially the same number of teeth. The output gear 49 connected to the second clutch 36 is positioned closer to the input shaft 35 than the input gear 52 on the output shaft 10. The number of the friction plates 56, 57 included in the first clutch 37 is equal to that of the friction plates 44, 45 included in the second clutch 36. Consequently the apparatus is adapted to give the same output speed in the forward position and in the reverse position and is also prevented from delivering an unnecessary output when both the first and second clutches are in a disengaged state. The contemplated object of the invention can be achieved even when the input gears 59, 47, as well as the output gears 60, 49, slightly differ in tooth number.

The rear end of the lower intermediate transmission shaft 39 is connected in the chamber B to the first intermediate transmission shaft 11 of the PTO system by a coupling to transmit the power to the shaft 11 independently of the operation of the clutches 36, 37.

The pressure oil is supplied to and discharged from the clutches 36, 37 through internal oil channels 61, 62 extending through the intermediate transmission shafts 38, 39. The ends of these shafts 38, 39 projecting into the main clutch chamber F are provided with rotary joints 63, 64, which are connected by blocks 66, 67 to a control valve 65 mounted on the top of the main clutch housing 2. The connecting blocks 66, 67 have internal oil channels.

The control valve 65 is of the rotary type and has an operating arm 68 which is coupled by a release wire 71 to a forward-reverse changeover lever 70 provided in the vicinity of a steering wheel 69.

As will be apparent from the foregoing description, the transmission system has as arranged in series the forward-reverse changeover mechanism of the hydraulic clutch type to be controlled by the changeover lever 70, the main speed change mechanism 17 to be operated by a main speed change lever 72 for giving four different speeds, and the auxiliary speed change mechanism 33 to be operated by an unillustrated auxiliary speed change lever for affording two different speeds. Thus the system gives eight forward speeds and eight reverse speeds at the speed ratios provided by these mechanisms.

Furthermore the output gear 49 connected to the second multiplate clutches 36 is positioned closer to the input shaft 35 than the input gear 52 on the output shaft 10 to thereby avoid simultaneous meshing of the output gear 49 of the second clutch 36 and the reverse rotation gear 51 with the input gear 52 on the output shaft 10, whereas the same output speed is made available in the forward position and in the reverse position because the output gears of the first and second clutches have substantially the same number of teeth.

In the case where first and second multiplate clutches which are different in the number of frictional transmission plates are used as conventionally practiced, the transmission plates are brought into contact with one another by being subjected to an external force when the clutch is engaged, and the plates are relieved of the force when the clutch is disengaged but they still remain in contact with one another even in the disengaged state. Accordingly even if both the first and second clutches are in the disengaged state, the clutch which is the larger in the number of transmission plates delivers an unnecessary output. This entails the drawback, for example, of adversely affecting the control of the gear speed change mechanisms to which the power is transmitted from the changeover apparatus or inadvertently advancing the tractor.

However, the construction of the embodiment described above is free of any of such drawbacks and is therefore very useful because the frictional transmission plates 56, 57 included in the first clutch 37 are made equal in number to the number of the plates 44, 45 included in the second clutch 36 although the output gear 49 coupled to the second clutch 37 is positioned closer to the input shaft.

In embodying the present invention, the means for operating the first and second clutches 37, 36 can be modified variously. For example, a force doubling cam mechanism is useful for manually engaging and disengaging these clutches.

The present invention is useful for various working vehicles including movable agricultural machines, such as combines and transport vehicles, and construction machines, such as backhoes and front loaders.

We claim:

1. A forward-reverse changeover apparatus for a working vehicle comprising
    an input shaft,
    an output shaft arranged coaxial with and separated from said input shaft,
    a first intermediate shaft for a reverse rotation disposed parallel to said input shaft,
    a second intermediate shaft for a forward rotation disposed parallel to said input shaft, said second intermediate shaft constituting part of a power takeoff to transmit power to a power takeoff shaft,
    an output gear fixed to said input shaft,
    an input gear fixed to said output shaft,
    a first multiplate clutch disposed on said second intermediate shaft,
    a second multiplate clutch disposed on said second intermediate shaft,
    a first gear in mesh with said output gear and fixed to said second intermediate shaft upstream of said first multiplate clutch,
    a second gear in mesh with said output gear and fixed to said first intermediate shaft upstream of said second multiplate clutch,
    a second output gear mounted for free rotation on said second intermediate shaft to receive power from said first multiplate clutch and in mesh with said input gear,
    a third output gear mounted for free rotation on said first intermediate shaft to receive power from said second multiplate clutch, and
    a back gear disposed between said first intermediate shaft and said output shaft
    wherein said first and second gears have an equal number of teeth, and said second and third output gears on said first and second intermediate shafts have a substantially equal number of teeth, said third output gear on said first intermediate shaft being displaced toward said input shaft to be out of contact with said input gear, and said back gear having a large width to mesh with said third output gear on said first intermediate shaft and with said input gear simultaneously.

2. An apparatus as defined in claim 1 wherein the first clutch includes frictional transmission plates which are equal in number to the number of frictional transmission plates included in the second clutch.

3. An apparatus as defined in claim 1 wherein the first and second clutches are substantially identical with each other in construction.

4. An apparatus as defined in claim 3 wherein the first clutch is provided between the first input gear and the second output gear, and the second clutch is provided between the second input gear and the output gear.

5. An apparatus as defined in claim 4 wherein the first and second input gears are provided in the vicinity of a rear wall of a main clutch housing, and the second and third output gears are provided in the vicinity of a bracket within a transmission case.

* * * * *